May 14, 1968          J. LUNDEN          3,382,754
DEVICE FOR PLUMBING AND ORIENTING UPRIGHTS
Filed May 4, 1965          2 Sheets-Sheet 1
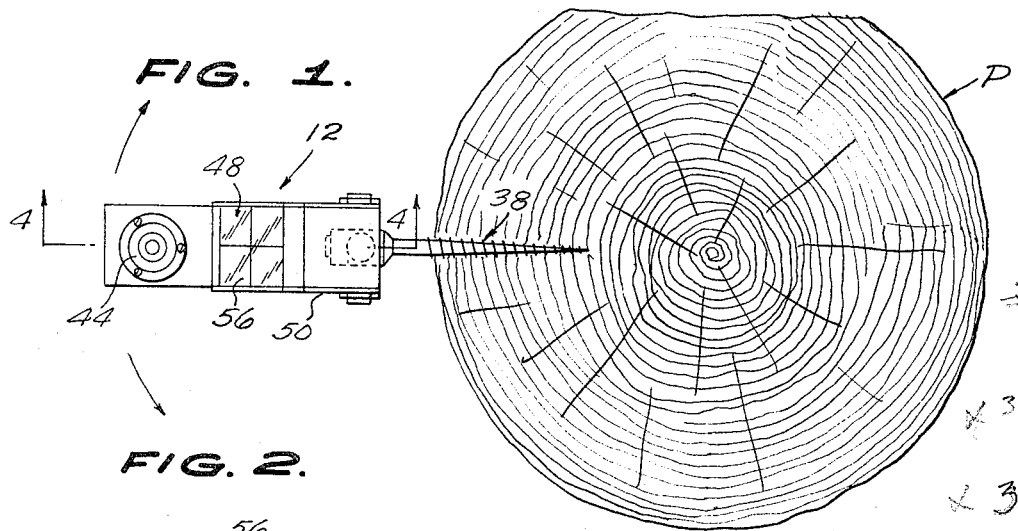
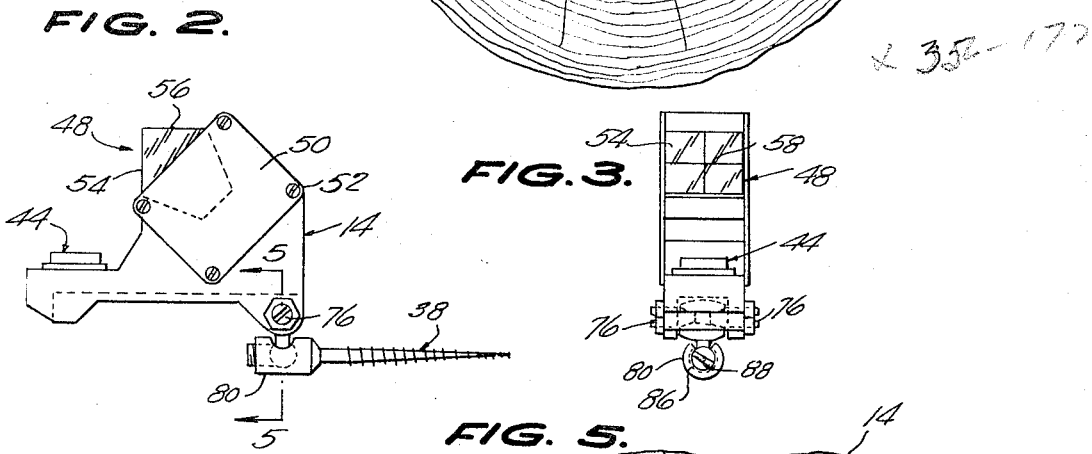
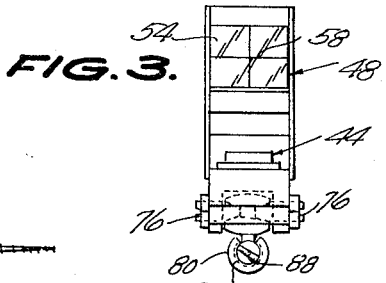
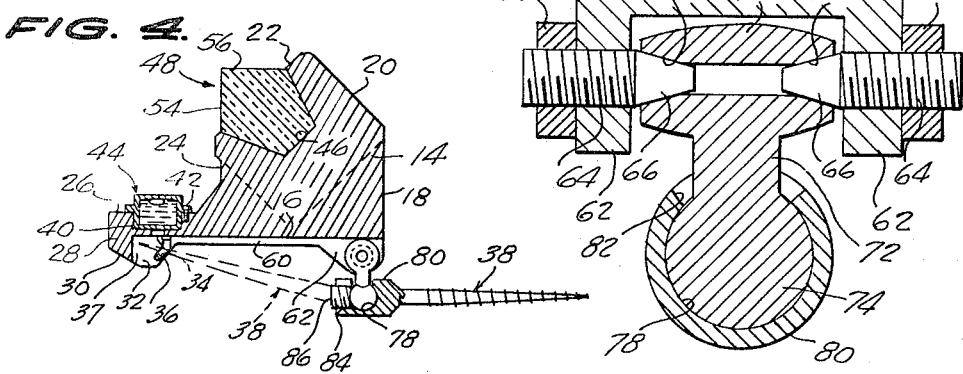
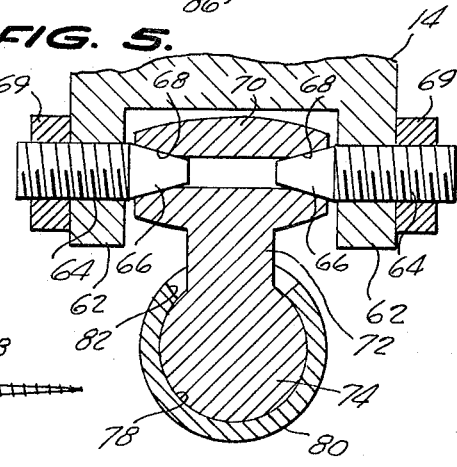
INVENTOR.
JACK LUNDEN,
BY
Berman, Davidson & Berman
ATTORNEYS.

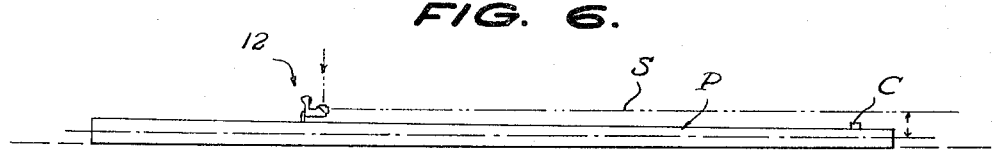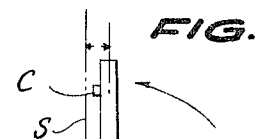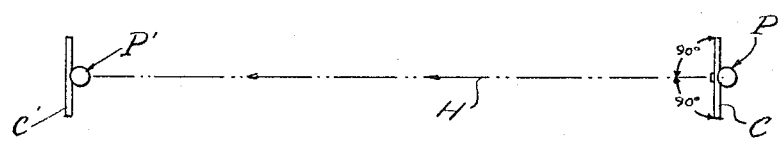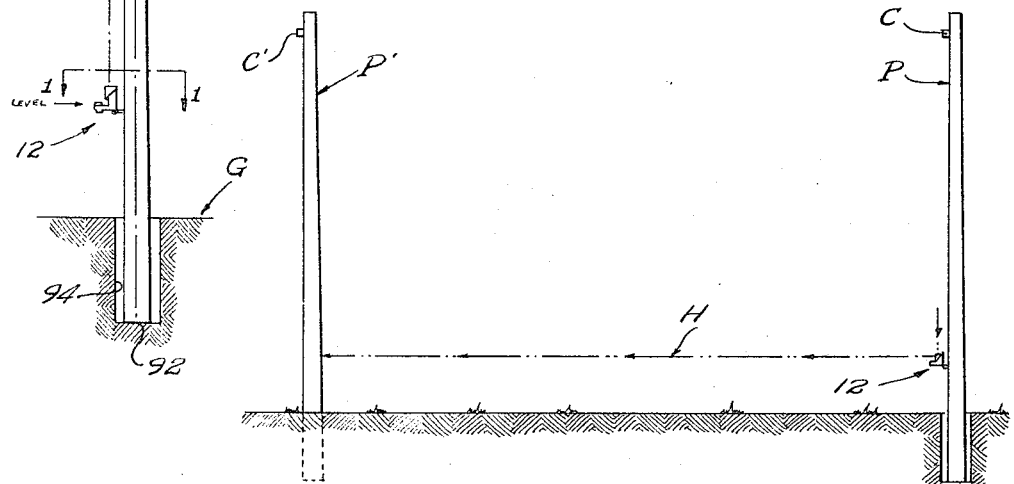

United States Patent Office 3,382,754
Patented May 14, 1968

3,382,754
DEVICE FOR PLUMBING AND
ORIENTING UPRIGHTS
Jack Lunden, Box 405, Homer, Alaska 99603
Filed May 4, 1965, Ser. No. 453,090
7 Claims. (Cl. 88—2.3)

ABSTRACT OF THE DISCLOSURE

A device for plumbing uprights comprising a prism having horizontal and vertical sighting surfaces, a bubble level having a viewing face parallel to the horizontal sighting surface, and a prism mounting means including a vertical spindle and a horizontal pivot permitting the prism to be vertically tilted toward and away from the side of an upright through an arc greater than 90°. Adjustments permit not only positioning a pole vertically, but turning it about its own axis to properly face a preceding pole.

---

This invention relates to a device for plumbing vertical members, such as utility poles, pilings, and other timber or steel uprights, as the members are being installed; and for testing the plumb of already installed members.

The primary object of the invention is the provision of a compact, convenient, accurate and easily used device of the kind indicated, which is readily used in confined quarters and under adverse weather conditions, such as heavy winds, the use of the said device serving to eliminate the several time and labor-consuming operations commonly required and employed for the purpose.

Another object of the invention is the provision of a device of the character indicated above, wherein are combined a prism affording right-angularly related lines of sight, and a bubble level for orientating the lines of sight relative to the ground and/or to already installed uprights; and convenient and efficient means for mounting the device on the side of an upright, the prism and the level being in fixed relation to each other and being articulated as a unit, to the mounting means, for adjustments relative thereto, on vertical and horizontal axes.

A further object of the invention is the provision of a device of the character indicated above, which is adapted to be installed on and adjusted relative to an upright, before the upright is erected and while the upright is in a horizontal position.

In the drawings:

FIGURE 1 is an enlarged horizontal section, taken on the line 1—1 of FIGURE 7 showing a device of the invention installed on an upright;

FIGURE 2 is a side elevation of said device, per se.

FIGURE 3 is a left-hand end elevation of FIGURE 2;

FIGURE 4 is a vertical longitudinal section taken on the line 4—4 of FIGURE 1;

FIGURE 5 is an enlarged fragmentary vertical transverse section taken on the line 5—5 of FIGURE 2;

FIGURE 6 is a side elevation, showing the device installed on an upright prior to the erection of the upright;

FIGURE 7 is a side elevation, showing the upright in the process of being erected;

FIGURE 8 is a top schematic view showing the device installed on an upright in the process of being erected in parallel relation to an already erected upright, lateral adjustability of the device relative to the first-mentioned upright being indicated, for test purposes; and FIGURE 9 is a side elevation of FIGURE 8.

Referring in detail to the drawings, the illustrated device 12 comprises a permissibly solid vertically and longitudinally-elongated, rectangular cross-sectional body 14 having a flat, normally horizontal underside 16, and an inner end 18 normal to the underside. The top of the body 14 is defined by an inwardly and downwardly-declining inner upper surface 20, and an outwardly and downwardly-declining outer surface 22, the latter surface terminating at its lower end in an irregular or mutilated vertical outer end 24. The outer end 24 leads down to a flat upper surface 26 of an outwardly-extending horizontal extension 28, the upper surface being parallel to the underside 16 of the body.

The extension 28 has a downwardly-extending enlargement 30 at its outer end which is under-cut to define an inwardly and downwardly-opening bottom recess 32 having a top wall 34 which is coplanar with the underside 16 of the body 14. A leaf spring, or clip, 36 extends downwardly from the top wall 34 which is adapted to releasably clamp between itself and a sidewall 37 of the recess 32 and the distal end of a screw 38 in the storage position of the screw, as indicated in phantom lines in FIGURE 4.

The extension 28 is formed with a circular top recess 40 in which is seated and is secured in place, as indicated at 42, a bubble level 44.

The outer surface 22 of the top of the body 14, at one side of the body 14, is formed with an upwardly-flared recess 46, in which is conformably seated a prism 48. The prisim 48 is held in place as by means of a removable side plate 50 secured to the related side of the body 14, as by means of screws 52.

The upper part of the prism 48 projects above the body surface 22 and is formed with an outer vertical surface 54 which is perpendicular to the underside 16 of the body 14, and with a horizontal surface 56 which is disposed at right angles to the surface 54. Each of the surfaces 54 and 56 is provided with centrally and right-angularly-intersecting crosshairs 58. With a pentagonal prism as illustrated, a vertical light ray entering through the horizontal sighting face 56 will be totally internally reflected to emerge horizontally through the vertical sighting face 54. Similarly, a horizontal light beam entering the sighting face 54 will be reflected and emerge vertically through the horizontal sighting face 56 in a manner which is well-known and conventional.

As indicated in FIGURE 4, laterally-spaced flanges 60 extend downwardly from and along the sides of the underside 16 of the body 14, which have downwardly-extending ears 62 at the inner ends thereof, the ears 62 having opposed bolts 64 threaded therethrough. As indicated, in phantom lines, in FIGURES 3 and 5, the bolts 64 have tapered inner ends 66 which are engaged in tapered sockets 68 provided in the ends of a trunnion 70, and have lock nuts 69 on their outer ends. Fixed to and extending downwardly from the trunnion 70, at right angles thereto, is a shank 72 having a ball 74 on its lower end. The bolts 64 have turning slots 76 in their outer ends. The trunnion 70 and the bolts 64 define the horizontal transverse axis of adjustment of the device.

The ball 74 is rotatably confined in a conformably-shaped socket 78 formed intermediate the ends of a horizontally-elongated block 80. An opening 82 in the top of the block 80 passes the shank 72 freely and communicates with an unnumbered slot which extends to the outer face of block 80 as seen in FIGS. 4 and 5, and a longitudinal threaded bore 84 leading from the outer end of the block 80 into the socket 78 accommodates a ball-clamping plug 86 having a turning slot 88 in its outer end. The vertical axis of adjustment of the device 12 is provided by the ball 74 and the socket 78, providing for rotary adjustments of the body 14 relative to the block 80, as well as tilting adjustments thereof relative to the block 80.

The inner end of the block 80 has suitably fixed thereto an axially-inwardly-extending tapering mounting screw 38 which, as indicated in FIGURES 6 to 9, is adapted to be screwed into the side of an upright P, at a point above the lower end 92 thereof such that when the upright is erected in the ground G, as in a post hole 94, the device 12 will be positioned above the level of the ground G.

In use and operation, the device 12 may be utilized to install any vertical upright such as the telephone pole P having an upper crossbar C in the following manner. While the pole is lying horizontally on the ground, as in FIGURE 6, with the crossbar C which is to face the preceding pole on its upper surface, the device 12 is attached near the bottom end of the pole, but at a level above the intended ground level, by threading the screw 38 into the center of the upper surface of the pole. The amount the screw is threaded into the pole plus the axial length of the screw head permits for spacing of the body 14 from the side of the pole sufficient to provide for tilting said body as required and for sighting through face 54 along the horizontal line S parallel to the axis of the prone pole while elevating or compensating slightly to allow for said spacing and the upward taper of the pole to bring the crossbar into the line of sight. With the set screw 86, FIGURE 4, loosened, a vertical sighting is then taken along the arrow, FIGURE 6, into the sighting face 54 and the body 14 is turned to rotate ball 74 in the socket 78 about the axis of screw 38 so as to align the pole with the vertical plane containing the line of sight S and one of the crosshairs. The body 14 may then be turned about the axis of its trunnion screws 66 to align the other crosshair visible in sighting face 54 with the crossbar C, this serving as a check on the adjustment of the ball 74. The crossbar C and pole being perpendicular to each other, their intersection should, therefore, center and align with the crosshairs in the prism face 54. Thus, the established position of the device provides a line of sight S at 90° to the base of the circular bubble level 44. The pole P may then be lifted, set in hole 94, FIGURE 7, adjusted to center the bubble in the level 44, and held in this position while earth is tamped around the pole in the hole 94, ensuring that the installed pole is perpendicular to the ground.

For installing succeeding poles in a pole lines, each to be turned properly facing the preceding pole, reference is made to FIGURES 8 and 9 wherein the already installed pole is indicated at P' as having a cross-arm C'. The succeeding pole P is erected in its hole in the ground with the device 12 attached centrally on the face to be turned toward pole P' and used as in the manner described above in relation to FIGURES 6 and 7. However, before the pole is tamped in final position, a vertical sighting is taken downwardly into the sighting face 56 establishing a horizontal line of sight H to the axis of the preceding pole P' which must align with one of the crosshairs in said sighting face 56. The trunnions 66 permit elevating the line of sight or depressing it if necessary to bring the pole P', which may be at a higher or lower level than pole P, into the field of view. If the pole P is not facing properly it is turned until such alignment exists at which time the pole P is held in place and the dirt tamped to secure it firmly in the set position.

What is claimed is:

1. A device for plumbing uprights comprising a body having inner and outer ends and an underside, a prism mounted on the body and having an upper horizontal sighting surface parallel spaced from the underside of the body, and an outer vertical sighting surface at the outer end of the horizontal sighting surface, said vertical sighting surface being perpendicular to the horizontal sighting surface, a horizontal bubble level fixed on the outer end of said body below the vertical sighting surface of the prism, and means adjustably mounting the body to extend laterally from a side of an upright, said mounting means comprising horizontal transverse pivotal means on and connected to the body at the underside of the body at the inner end of the body, a ball fixed to and extending downwardly from said pivotal means, a normally horizontal block formed with a ball socket opening to the top thereof, said ball being confined in the socket, said block having an inner end, and a member fixed to the inner end of the block and adapted to be secured to an upright, said member comprising a screw axially-aligned with said block.

2. A device for plumbing uprights, comprising a body carrying a prism having a horizontal upper sighting surface and a vertical sighting surface for receiving a light beam perpendicular to either of said surfaces and projecting the same at right angle to the other of said surfaces, a bubble level on the body having an upper viewing face parallel to the horizontal sighting surface of the prism, and means for mounting the body to the side and spaced from an upright to be plumbed, said mounting means including an elongated member extending at one end from adjacent of said body and having securing means at the other end adapted to be securely engaged with an upright, vertical spindle rotatably supported in said one end of said member in such manner as to permit rotation of said body about an axis normal to said horizontal sighting surface through an arc greater than 180°, and pivotal means having its pivot axis parallel to said sighting surfaces connecting said body to said vertical spindle in such manner as to permit said body to be vertically tilted toward and away from the side of an upright through an arc greater than 90° when the member is secured thereto whereby to enable projection of lines of sight along and toward the upright and along and below the horizontal.

3. A device according to claim 2 wherein said mounting means comprises a ball secured to said vertical spindle and a socket receiving said ball formed in said one end of said elongated member, said securing means comprising a screw adapted to be threaded into the side of an upright so as to position the device spaced outwardly with respect thereto.

4. A device according to claim 3 wherein said one end of the elongated member is formed with a slot in its upper face communicating with said socket and passing said vertical spindle, said body being provided with a spring clip on its underside spaced from said one face and adapted to receive and hold said screw when not applied to an upright by turning movement of said screw about said ball.

5. A device according to claim 3 wherein said elongated member is additionally provided with an aperture leading to said socket, and a clamping member releasably mounted in said aperture to engage and clamp said ball against turning movements in said socket.

6. The method of checking the verticality of an upright having a cross-arm as the upright is being installed and after the upright has been installed in the ground, comprising the steps of mounting a prism on one side of and near one end of the upright while the upright is lying prone, said prism when thus mounted having a horizontal sighting surface, a vertical sighting surface, two pivotal axis means at right angles to one another, one normal to the horizontal sighting surface and the other parallel to said sighting surfaces, a bubble level having a viewing face parallel to said vertical sighting surface, and centered crosshairs on each of said sighting surfaces, sighting downwardly through said horizontal sighting surface to establish a substantially horizontal line of sight defined by apparent coincidence of the pair of crosshair intersections, rotating said prism about said pivotal axes to align the upright with its vertical crosshairs and center said cross-arm with respect to the coincident crosshair intersections, setting said one end of the upright approximately vertical in a receiving hole and adjusting the upright exactly to vertical by moving the upright to center the bubble of said level.

7. A method of checking the verticality of a second upright to be erected in the ground turned properly facing a first already installed upright whether at the same, a higher or lower elevation, comprising the steps of mounting a prism near one end of the second upright and on the side which is to face the first upright while said second upright is lying prone, said prism when thus mounted having a horizontal sighting surface, a vertical sighting surface, two pivotal axis means at right angles to one another one normal to the horizontally sighting surface and the other parallel to said sighting surfaces, a bubble level having a viewing face parallel to said vertical sighting surface and centered crosshairs on each of said sighting surfaces, sighting downwardly through said horizontal sighting surface to establish a substantially horizontal line of sight defined by apparent coincidence of the pair of crosshair intersections, rotating said prism about said pivotal axes to align the second upright parallel to said line of sight, setting said one end of the second upright approximately vertical in a receiving hole, adjusting the second upright exactly to vertical by moving the upright to center the bubble of said level, sighting downwardly into the initially vertical sighting face of the prism now disposed horizontally to establish a second substantially horizontal line of sight, and turning said second upright about its own axis while tilting the prism as necessary in a vertical plane by rotating said prism about its other axis until the said second line of sight meets the first upright.

References Cited

UNITED STATES PATENTS

| | | | |
|---|---|---|---|
| 338,791 | 3/1886 | Smith | 88—2.2 |
| 1,012,740 | 12/1911 | Stamps | 88—2.2 |
| 1,817,671 | 8/1931 | Brunstetter et al. | 88—2.2 |
| 2,198,836 | 4/1940 | Patton | 33—46 |
| 3,057,250 | 10/1962 | Griffith | 88—2.2 |
| 3,167,864 | 2/1965 | Lange | 33—73 X |

FOREIGN PATENTS

| | | |
|---|---|---|
| 192,688 | 12/1907 | Germany. |
| 301,736 | 9/1919 | Germany. |
| 99,542 | 6/1923 | Switzerland. |

ROBERT B. HULL, *Primary Examiner.*